Oct. 11, 1927.
B. E. O'HAGAN
1,645,251
ELECTRICAL APPARATUS
Filed Aug. 4, 1926
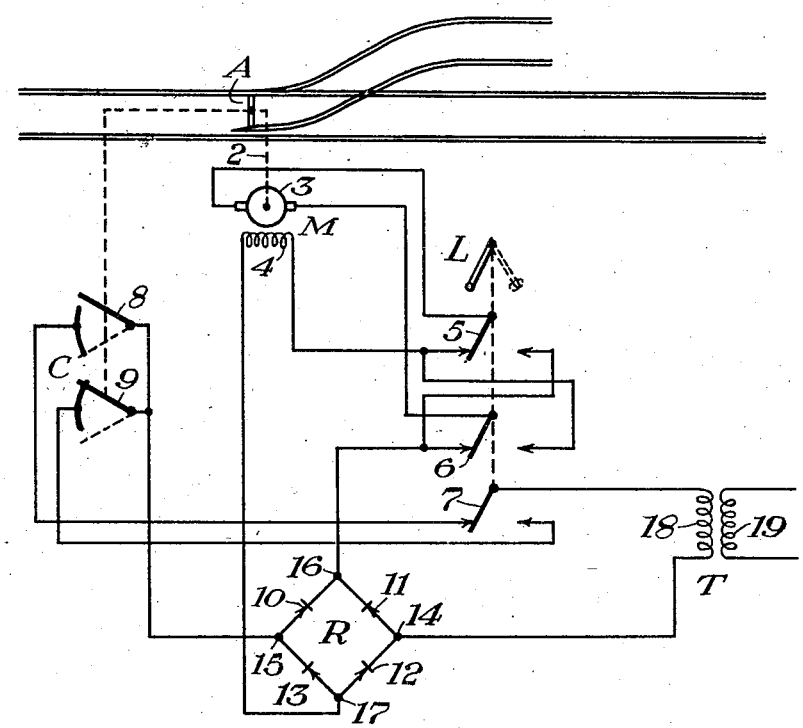
INVENTOR:
B. E. O'Hagan,
by A. L. Vencill
His Attorney Patented Oct. 11, 1927.

1,645,251

UNITED STATES PATENT OFFICE.

BERNARD E. O'HAGAN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL APPARATUS.

Application filed August 4, 1926. Serial No. 126,966.

My invention relates to electrical apparatus and particularly to apparatus of the type comprising a direct current electro-responsive device operated from an alternating current source through a rectifier. My invention is particularly well adapted for the operation of railway traffic controlling devices, such as railway switches and signals, although it is not limited to such adaptation.

I will describe one form of apparatus embodying my invention, and will then point out the novel features thereof in claims.

The accompanying drawing is a diagrammatic view showing one form of apparatus embodying my invention.

Referring to the drawing, the reference character A designates a railway switch which is operated by a direct current motor M through the medium of suitable mechanism indicated diagrammatically by the dotted line 2. The motor M comprises an armature winding 3 and a field winding 4, which windings are supplied with uni-directional current from a transformer T through the medium of a rectifier R. The motor M is controlled in part by a circuit controller L which may be manually-operated or manually controlled, and in part by a circuit controller C actuated by the switch A.

The rectifier R is of the full-wave type comprising four units 10, 11, 12 and 13. Each of these units may be of any suitable type, such for example as the type shown in application for Letters Patent of the United States filed by Lars O. Grondahl on the 27th day of January, 1925, Serial No. 1,111. This rectifier has two input terminals 14 and 15, and two output terminals 16 and 17.

The primary 19 of transformer T is constantly supplied with alternating current from a suitable source not shown in the drawing.

The circuit controller L has a normal position wherein contacts 5, 6 and 7 are swung to the left, and a reverse position wherein these contacts are swung to the right. The circuit controller C comprises two contacts 8 and 9, the former of which is closed in all positions of the switch except the normal position, and the latter of which is closed in all positions of the switch except the reverse position.

The lower terminal of secondary 18 of transformer T is constantly connected with input terminal 14 of rectifier R, while the upper terminal of secondary 18 is at times connected with the input terminal 15 through contact 7 and contact 8 or 9.

As shown in the drawing, the switch A is in the normal position and circuit controller L is in the normal position, so that the input circuit for rectifier R is open, with the result that the rectifier and motor M are both de-energized. I will now assume that the circuit controller L is swung to the right. The upper terminal of secondary 18 is then connected with input terminal 15 of rectifier R through contact 7 and contact 9. Motor M is then energized by a circuit which passes from the output terminal 16 of rectifier R, through contact 5 of circuit controller L, armature 3, contact 6 of circuit controller C, and field winding 4 to output terminal 17. The motor M then operates in such direction as to move switch A to its reverse position, and upon the completion of this movement contact 9 of circuit controller C opens, thereby discontinuing the supply of energy to the rectifier R and so to the motor M. With switch A in the reverse position, if circuit controller L is restored to its normal position, the upper terminal of secondary 18 of transformer T becomes connected with rectifier input terminal 15 through contacts 7 and 8, and the motor M is energized by a circuit which passes from rectifier output terminal 16, through contact 6, armature 3, contact 5, and motor field winding 4 to output terminal 17. Motor M then operates in such direction as to restore switch A to its normal position, and when the movement of the switch is completed the input circuit for the rectifier is opened at contact 8 of circuit controller C.

It will be noted that the armature 3 and the field winding 4 of motor M are constantly connected with the output terminals of the rectifier R, and that the operating current always flows through field winding 4 in the same direction, whereas the operating current flows through the armature 3 in one direction or the other, depending upon the position of the circuit controller L.

It will also be noted that the input circuit for the rectifier R is open at all times except when the motor M is actually operating. This permits the use of a rectifier having smaller units than would be possible if the input circuit of the rectifier were always closed.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a source of alternating current, a full-wave rectifier having its input terminals connected with said source with a circuit controller interposed between one input terminal and one terminal of the source, and a direct current electro-responsive device receiving energy from the output terminals of said rectifier.

2. In combination, a source of alternating current, a full wave rectifier, a direct current motor having two windings constantly connected with the output terminals of said rectifier, a circuit controller having contacts for reversing the connections of one said winding but not the other with said terminals, a railway switch operated to normal and reverse positions by said motor, and means controlled jointly by said circuit controller and by said switch for supplying current from said source to said rectifier.

3. In combination, a source of alternating current, a full wave rectifier, a direct current motor having two windings constantly connected with the output terminals of said rectifier, a circuit controller having normal and reverse positions and provided with contacts for reversing the connections of one said winding but not the other with said terminals, a railway switch operated to normal and reverse positions by said motor, and means controlled jointly by said circuit controller and by said switch for supplying current from said source to said rectifier when said circuit controller and said switch do not harmonize in normal or reverse positions but not when they do harmonize in such positions.

4. In combination, a source of alternating current, a full wave rectifier, a direct current motor having two windings constantly connected with the output terminals of said rectifier, a circuit controller having normal and reverse positions and provided with contacts for reversing the connections of one said winding but not the other with said terminals, a railway switch operated to normal and reverse positions by said motor, a connection from one terminal of said source to one input terminal of said rectifier, a connection from the other terminal of said source to the other input terminal of said rectifier including a contact closed when said circuit controller is in normal position a contact closed when said switch is in any position except normal position, and a second connection between said other terminal of the source and said other input terminal of the rectifier including a contact closed when said circuit controller is in reverse position and a contact closed when said switch is in any position except reverse position.

5. In combination, a source of alternating current, a full wave rectifier, a direct current motor having two windings constantly connected with the output terminals of said rectifier, a circuit controller having contacts for reversing the connections of one said winding but not the other with said terminals, a mechanism operated by said motor, and means controlled jointly by said circuit controller and by said mechanism for supplying energy from said source to said rectifier.

6. In combination, a source of alternating current, a full-wave rectifier, a direct current motor constantly connected with the output terminals of said rectifier, a mechanism operated by said motor, means for connecting said source with said rectifier to start the operation of said mechanism, and means actuated by said mechanism for discontinuing the supply of energy from said source to said rectifier upon the completion of the operation of the mechanism.

7. In combination, a source of alternating current, a rectifier, a direct-current electro-responsive device constantly connected with the output terminals of said rectifier, a circuit controller, and means controlled jointly by said circuit controller and by said electro-responsive device for supplying energy from said source to said rectifier.

In testimony whereof I affix my signature.

BERNARD E. O'HAGAN.